April 21, 1936.   T. HUTCHINSON   2,038,362
SORTING CONVEYER
Filed Jan. 30, 1935

INVENTOR
Thomas Hutchinson

Patented Apr. 21, 1936

2,038,362

UNITED STATES PATENT OFFICE 2,038,362

SORTING CONVEYER

Thomas Hutchinson, Newport, Oreg.

Application January 30, 1935, Serial No. 4,155

3 Claims. (Cl. 209—82)

This invention relates to a sorting conveyer for use principally in lumber saw mills, an object being to provide a construction which will permit the wood to be more readily assorted and arranged in piles.

Another object of the invention is to provide a sorting conveyer which is adapted to receive wood directly from the saw mill and transport the same over a certain course so that workmen may remove the sawed lumber and arrange the same in piles with lumber of the same length in a pile, the conveyer being such as to, in a limited sense, shift the position of boards or beams of different lengths.

A further object more specifically is to provide a sorting conveyer for lumber wherein a number of conveying chains are provided and positioned at different elevations so that lumber of one length will be inclined one way while being carried by the conveyer and lumber of a different length will be inclined in the opposite direction.

In the accompanying drawing—

Figure 1:
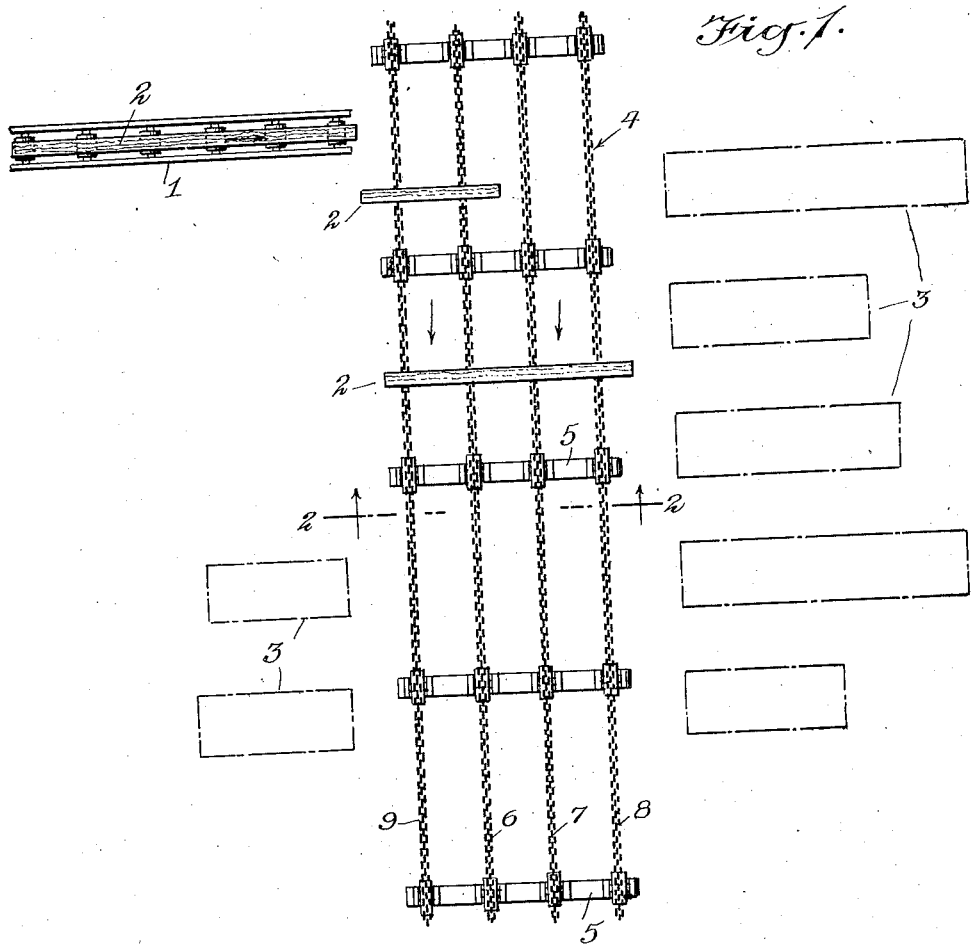
Figure 2:
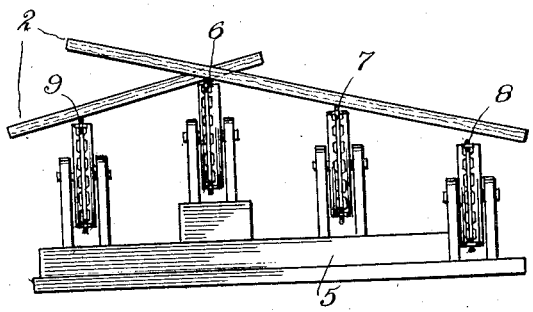

Figure 1 is a schematic view of a conveyer and associated parts disclosing an embodiment of the invention, and Fig. 2 is a sectional view through Fig. 1 on the line 2—2.

Referring to the accompanying drawing by numerals, 1 indicates a conveyer extending to a point near the saw of a saw mill so as to receive the various boards, beams, or lumber 2 therefrom. Some of these boards or beams are comparatively short while others are comparatively long, as, for instance, thirty feet long. These pieces of lumber are naturally of different weight and the longer lumber sometimes is so heavy as to be very difficult for one person to handle. The usual practice heretofore has been to provide some sort of an auxiliary conveyer and from the auxiliary conveyer the lumber is arranged in piles 3.

In the present invention, a sorting conveyer 4 is provided which is so positioned that the conveyer 1 will discharge the lumber directly thereon. It will be understood that an attendant is usually at the end of the conveyer 1 so as to see that the lumber is properly positioned on the sorting conveyer. The sorting conveyer 4 may be of any desired length and acts to transport the lumber from the conveyer 1 to a distant point. If the lumber were not removed from the sorting conveyer 4 intermediate its length, said lumber would naturally be dumped off at the end 5.

It will be understood that the conveyer 1 is made up of a number of chains, pulleys, and suitable supports. The chains are driven by any suitable power means (not shown), said power means and the connection of the chains therewith being similar to that now in common use. Heretofore four chains have been used in conveyers but all of the chains were in the same horizontal plane. In the present invention the chains 6, 7 and 8 are in different horizontal planes. Chain 9 is shown in the same plane as chain 7, although it could be higher or lower without departing from the spirit of the invention. By this arrangement, as clearly shown in Fig. 2, when a short piece of lumber is discharged on to the conveyer 4 it will rest on the chains 6 and 9 and, consequently, will tilt to the left. However, if the piece of lumber is comparatively long, it will tilt to the right and rest on the chains 6 and 7, or 7 and 8. By this arrangement the longer pieces of lumber are sorted from the short pieces and workmen on each side of the conveyer may easily remove the lumber therefrom. The practice heretofore was that when a long piece of lumber came to a certain workman, he would grasp the same and pull the lumber from the conveyer and place the same in a pile, as, for instance, in one of the piles 3. This required great effort and many times it was very difficult to remove the lumber. By having the lumber inclined to the right, as shown in Fig. 2, a heavy piece of lumber may easily be slid off the conveyer by a single workman and then placed on the pile. A number of workmen may be positioned on each side of the conveyer 4 so that the various long pieces of lumber may be removed by these workmen, and, if desired, each workman can remove a certain sized piece of lumber so that the various piles of units 3 may each contain lumber of a certain length. The workmen on the opposite side would remove the short pieces of lumber and form piles 3' which may be of slightly different sizes but always shorter than the lumber on the opposite side of the conveyer.

By the construction shown particularly in Fig. 2, the lumber is sorted automatically somewhat and the workmen complete the sorting so that each pile or unit 3 or 3' would have lumber of the same length.

In addition to assisting the workmen in sorting the lumber, the device presents a conveyer which makes it very easy for a workman to remove the lumber from the conveyer even though very heavy.

I claim:

1. A sorting conveyer for lumber mills and the like, comprising a conveyer structure positioned to receive lumber from the mill, said conveyer structure including a plurality of movable chains, and means mounting the chains in different horizontal planes, the outside chains being in horizontal lower planes for their full lengths while the inside chains are in a higher plane in a stepped formation so that when lumber is discharged on to the conveyer transversely thereof it will automatically move under the action of gravity to different inclinations and be transported in that manner, the inclination of the lumber permitting the same to be easily removed by workmen at any point along the conveyer.

2. A conveyer, including a structure having four conveying chains adapted to move in horizontal planes, means for supporting said chains at different horizontal elevations, said means causing three of the chains to be arranged in a stepped formation, the lowest being the outside chain and the highest one of the inner chains whereby the lumber discharged on to the conveyer transversely thereof will automatically fall to an inclined position, the short lumber inclining in one direction while the long lumber inclines in an opposite direction.

3. A sorting conveyer, including a plurality of conveying chains arranged to move in horizontal planes, said chains being arranged in groups, one chain acting in both groups, said last-mentioned chain being in the highest horizontal plane and the chains arranged on each side being in lower planes, whereby when a piece of lumber is placed on the conveyer transversely thereof it will automatically under the action of gravity move to an inclined position, the short pieces of lumber inclining toward one side and the long pieces of lumber inclining toward the opposite side.

THOMAS HUTCHINSON.